Patented Jan. 12, 1943

2,307,872

UNITED STATES PATENT OFFICE 2,307,872

CHEMICAL PROCESS

Erving Arundale, Colonia, and Louis A. Mikeska, Westfield, N. J., assignors to Standard Oil Development Company, a corporation of Delaware No Drawing. Application December 28, 1940, Serial No. 372,171

18 Claims. (Cl. 260—487)

The present invention relates to a method for the production of halogenated fatty acid esters of unsaturated alcohols. These novel unsaturated esters are obtained by the condensation of olefins or other unsaturated compounds with aldehydes in the presence of halogenated fatty acids. More particularly, the invention is concerned with the reaction between a mono-olefin such as trimethylethylene, an aldehyde such as formaldehyde, and a halogenated organic acid such as mono-, di-, or trichloracetic acid to yield the halogenated fatty acid ester of an unsaturated alcohol.

The reaction between olefins, aldehydes, and organic acids has been described in French Patent 717,712. According to the disclosure and claims of this patent, a strong mineral acid catalyst must be used to bring about the reaction. The product is a glycol diacetate which is finally saponified to a glycol.

The reaction of olefins with formaldehyde and organic acids in the presence of anhydrous metallic halides to form unsaturated esters has been described in copending application Serial No. 302,122 filed October 31, 1939.

The process of the present invention differs from the prior art in that the halogenated organic acid acts as (1) a catalyst for the olefin-aldehyde condensation reaction, (2) an esterification reagent, and (3) an esterification catalyst. No mineral acid or metallic halide catalyst is necessary in this process.

According to the present ivention, olefins or other unsaturated compounds, aldehydes, and a-halogenated fatty acids are condensed at ordinary or room temperature in the presence of a slight excess of the halogenated organic acid. Olefinic materials suitable for use in the process of the present invention include such olefins as proplyene, isobutylene, butene-1, butene-2, trimethylethylene, methylethylethylene, pentene-2, cyclohexene; unsaturated compounds such as unsaturated ethers or halides, as well as mixtures of olefinic and paraffinic hydrocarbons.

The aldehydes used in carrying out the process of this invention may be formaldehyde, acetaldehyde, propionaldehyde, or any compound such as polymers of aldehydes, e. g., paraformaldehyde (trioxymethylene), which will decompose to yield an aldehyde under the reaction conditions. The acid employed in the condensation is any one of the fatty acid series in which at least one of the substituents on the a-carbon atom is a halogen; other halogen substituents may be substituted in other positions along the aliphatic chain of the acid. Examples of such acids are mono-, di-, or trichloracetic acid, mono-, or di-, alpha chloropropionic acid, mono- or di-, alpha bromobutyric acid, etc.

The reactants preferably employed in the process are tertiary olefins, formaldehyde, and alpha chlorinated fatty acids.

The reaction proceeds readily at room temperature, however, temperatures between 10 and 40° C. may be used. At the temperature of the reaction, most of the lower olefins will exert a moderate to high vapor pressure. Therefore, in order to provide adequate contact between the reactants, the reaction should be conducted within a closed vessel capable of withstanding moderately high pressures. The reaction is fairly rapid and is complete within from 1 to 20 hours depending upon the reactivity of the olefin employed and the activity of the halogenated organic acid. The end of the reaction may be readily determined where solid forms of aldehydes are used, as it is indicated when all of the solid aldehyde is dissolved. It is desirable to use an excess of both olefin and organic acid over the aldehyde on a mol per mol basis. This excess will range from 0.1 to 1 mol.

The general procedure for carrying out the reaction is to place the reactants in a closed container equipped with a stirrer for providing intimate contact. The reactants are maintained at substantially room temperature and stirred until the reaction is complete after which the reaction mixture is washed once or twice with water, the lower ester layer being withdrawn after each wash. The ester is then treated with a dilute alkali solution of not more than 1% concentration and then extracted with an ether such as diethylether or di-isopropyl ether. The ether extract is water washed and then dried over a drying agent such as sodium sulfate, and filtered. The solvent is removed by evaporation and the residue vacuum distilled to recover the unsaturated ester. Instead of water washing, the crude reaction product resulting from the condensation of the olefin, aldehyde and acid may be purified by vacuum distillation directly whereby the ester is separated from any unreacted olefin and acid.

The unsaturated esters produced in accordance with the process of the present invention are heavier than and insoluble in water. They may be hydrolyzed to the corresponding unsaturated alcohols or cracked to give dienes.

The following example is given for the purpose of illustrating the invention:

60 parts of paraformaldehyde were placed in a reactor equipped with a stirrer and reflux condenser. 275 parts of dichloracetic acid (practical grade) were added thereto and stirred whereby a hazy pasty liquid resulted. The mixture was stirred and 150 parts of trimethylethylene were slowly run in with intermittent cooling. The temperature was maintained between 20° and 30° C. The paraformaldehyde disappeared and a clear solution resulted. The product was then washed twice with water. Ether was then added and the extract was treated with a dilute carbonate solution until neutral. The extract was then water washed and dried over sodium sulfate after which the ether was removed by evaporation and the product vacuum distilled. The majority of the material boiled between 100° and 120° C. at 3 mm. pressure.

What is claimed is:

1. A process comprising the reaction of an olefinic compound with a substance selected from the group consisting of aldehydes and compounds decomposing, under the conditions of the reaction, to yield aldehydes and a halogenated fatty acid which contains at least one halogen atom in the alpha position, and recovering the products of the reaction.

2. The process according to claim 1 in which the olefinic compound is a tertiary olefin containing a tertiary doubly bonded carbon atom to which a methyl group is attached.

3. The process comprising the reaction of an olefinic compound with formaldehyde and a halogenated fatty acid which contains at least one halogen atom in the alpha position, and recovering the products of the reaction.

4. The process comprising the reaction of a tertiary olefin which contains a tertiary doubly bonded carbon atom to which a methyl group is attached with formaldehyde and a halogenated fatty acid which contains at least one halogen atom in the alpha position, and recovering the products of the reaction.

5. The process of producing an unsaturated ester of an alpha halogenated acid of the fatty acid series which comprises condensing a tertiary acid olefin, a substance selected from the group consisting of aldehydes and compounds readily decomposing, under the conditions of the reaction, to yield aldehydes and an alpha halogenated acid of the fatty acid series, and recovering the unsaturated ester.

6. The process of producing an unsaturated ester of an alpha halogenated acid of the fatty acid series which comprises condensing a tertiary olefin, a substance selected from the group consisting of aldehydes and compounds readily decomposing, under the conditions of the reaction, to yield aldehydes and an alpha dihalogenated acid of the fatty acid series, and recovering the unsaturated ester.

7. A process in accordance with claim 5 in which the tertiary olefin contains a tertiary doubly bonded carbon atom to which a methyl group is attached.

8. A process according to claim 6 in which the tertiary olefin contains a tertiary doubly bonded carbon atom to which a methyl group is attached.

9. The process of producing an unsaturated ester of an alpha halogenated acid of the fatty acid series which comprises condensing a tertiary olefin, formaldehyde and an alpha halogenated acid of the fatty acid series, and recovering the unsaturated ester.

10. A process according to claim 9 in which the tertiary olefin contains a tertiary doubly bonded carbon atom to which a methyl group is attached.

11. The process of producing an unsaturated ester of chloracetic acid which comprises condensing a tertiary olefin, a substance selected from the group consisting of aldehydes and compounds readily decomposing, under the conditions of the reaction, to yield aldehydes and a chloracetic acid, and recovering the unsaturated ester.

12. A process according to claim 11 in which the tertiary olefin contains a tertiary doubly bonded carbon atom to which a methyl group is attached and in which the chloracetic acid is monochloracetic acid.

13. A process according to claim 11 in which the tertiary olefin contains a tertiary doubly bonded carbon atom to which a methyl group is attached and the chloracetic acid is dichloracetic acid.

14. A process according to claim 11 in which the tertiary olefin contains a tertiary doubly bonded carbon atom to which a methyl group is attached and the chloracetic acid is trichloracetic acid.

15. The process of producing an unsaturated ester of dichloracetic acid which comprises condensing trimethylethylene, trioxymethylene and dichloracetic acid at a temperature between 10° and 40° C. and recovering the unsaturated ester.

16. Process of producing an unsaturated ester of chloracetic acid which comprises condensing trimethylethylene, trioxymethylene and dichloracetic acid with stirring, and under pressure at least equal to the total vapor pressure of the reaction mixture and at room temperature, washing the condensate with water, removing the water and any unreacted olefin and acid, solvent extracting the washed condensate, removing the solvent by evaporation and recovering the unsaturated ester by vacuum distillation.

17. The process of producing an unsaturated ester of dichloracetic acid which comprises condensing trimethylethylene, trioxymethylene and dichloracetic acid at substantially room temperature and recovering the unsaturated ester of dichloracetic acid by vacuum distillation under fractionation conditions.

18. As a composition of matter, the ester of 2-methyl-butene-(1)-ol(4) and dichloracetic acid.

ERVING ARUNDALE.
LOUIS A. MIKESKA.